United States Patent
Nesch et al.

(10) Patent No.: US 7,107,693 B2
(45) Date of Patent: Sep. 19, 2006

(54) APPARATUS AND METHOD FOR PRECISE ANGULAR POSITIONING

(75) Inventors: Ivan N. Nesch, Crown Point, IN (US); Timothy I. Morrison, Darien, IL (US)

(73) Assignee: Illinois Institute of Technology, Chicago, IL (US)

(*) Notice: Subject to any disclaimer, the term of this patent is extended or adjusted under 35 U.S.C. 154(b) by 0 days.

(21) Appl. No.: 11/036,811

(22) Filed: Jan. 14, 2005

(65) Prior Publication Data

US 2006/0156556 A1 Jul. 20, 2006

(51) Int. Cl.
*B23Q 3/18* (2006.01)

(52) U.S. Cl. ............................ 33/1 N; 33/568; 33/1 M; 248/424

(58) Field of Classification Search ............... 33/1 M, 33/1 N, 568, 569, 573; 269/58, 71, 73; 248/419, 424, 425; 29/281.4; 359/391, 359/392, 393

See application file for complete search history.

(56) References Cited

U.S. PATENT DOCUMENTS

| | | | |
|---|---|---|---|
| 3,864,983 A | | 2/1975 | Jacobsen |
| 3,952,604 A | | 4/1976 | Baudler |
| 3,973,445 A | | 8/1976 | Ballard |
| 4,078,441 A | | 3/1978 | Mazur |
| 4,225,110 A | | 9/1980 | Akkerman et al. |
| 4,320,943 A | * | 3/1982 | Link ........................ 353/27 R |
| 4,351,197 A | | 9/1982 | Carson |
| 4,559,717 A | * | 12/1985 | Scire et al. .................... 33/568 |
| 4,559,843 A | | 12/1985 | Nilsson |
| 4,667,139 A | | 5/1987 | Hirai et al. |
| 4,667,415 A | * | 5/1987 | Barsky ......................... 33/568 |
| 4,711,157 A | | 12/1987 | Kayyod et al. |
| 4,805,543 A | * | 2/1989 | Schwab et al. ................ 108/20 |
| 4,887,804 A | * | 12/1989 | Ohtsuka ....................... 269/73 |
| 4,991,309 A | * | 2/1991 | Nagasawa et al. ............ 33/568 |
| 5,217,214 A | * | 6/1993 | Takei ........................... 269/73 |
| 5,329,825 A | | 7/1994 | Askins |
| 5,334,892 A | | 8/1994 | Chitayat |
| 5,622,078 A | | 4/1997 | Mattson |
| 5,657,523 A | | 8/1997 | Lin et al. |
| 6,016,607 A | | 1/2000 | Morimoto et al. |
| 6,028,376 A | | 2/2000 | Osanai et al. |

(Continued)

FOREIGN PATENT DOCUMENTS

JP 02312148 A * 12/1990

(Continued)

*Primary Examiner*—R. Alexander Smith
(74) *Attorney, Agent, or Firm*—Pauley Peterson & Erickson

(57) ABSTRACT

An apparatus and method for precise angular positioning of an object. A first pivot arm and a second pivot arm each is pivotally mounted with respect to a base. A pivot base flex member is operatively connected to the first pivot arm and allows the first pivot arm to pivot with respect to the base, within a particular plane. A second pivot base flex member is operatively connected to the second pivot arm and allows the second pivot arm to pivot with respect to the base, and also within either the same plane or a different plane as the plane within which the first pivot arm pivots. Support structures maintain each of the first pivot arm and the second pivot arm within the particular plane or planes. An interconnect flex member connects the first pivot arm and the second pivot arm. With a relatively small base and thus overall apparatus, an input movement, such as a linear input of about 10 mm can be translated into an output movement of about 7200 radians.

27 Claims, 3 Drawing Sheets

U.S. PATENT DOCUMENTS

| | | |
|---|---|---|
| 6,097,114 A | 8/2000 | Hazelton |
| 6,193,199 B1 | 2/2001 | Karam, II ................ 248/276.1 |
| 6,244,228 B1 | 6/2001 | Kuhn et al. |
| 6,310,342 B1* | 10/2001 | Braunstein et al. ......... 250/306 |
| 6,346,710 B1* | 2/2002 | Ue ....................... 250/442.11 |
| 6,415,679 B1 | 7/2002 | Chiodo |
| 6,445,514 B1* | 9/2002 | Ohnstein et al. ............ 359/813 |
| 6,467,761 B1* | 10/2002 | Amatucci et al. ............. 269/58 |
| 6,472,794 B1 | 10/2002 | Shibaike et al. ........... 310/309 |
| 6,688,183 B1* | 2/2004 | Awtar et al. .................. 73/782 |
| 2002/0078779 A1 | 6/2002 | Scheidegger et al. |
| 2004/0163450 A1* | 8/2004 | Gweon et al. ................ 73/105 |
| 2005/0198844 A1* | 9/2005 | Lee et al. .................... 33/1 M |

FOREIGN PATENT DOCUMENTS

| | | | |
|---|---|---|---|
| JP | 3121339 A2 | | 5/1991 |
| JP | 03129654 A | * | 6/1991 |
| JP | 5138484 A2 | | 6/1993 |

* cited by examiner

APPARATUS AND METHOD FOR PRECISE ANGULAR POSITIONING

BACKGROUND OF THE INVENTION

1. Field of the Invention

This invention relates to an apparatus and method for precisely positioning an object, such as positioning an optical lense in a precise rotational or angular position.

2. Discussion of Related Art

Conventional devices that can precisely position an object often include complex arrangements of many different gears, levers and other mechanical elements that move with respect to each other and also that engage with each other, resulting in friction and undesired mechanical play. The friction and mechanical play can cause inaccurate movements and positioning. Many conventional apparatuses that convert linear motion to rotational motion have movement inaccuracies caused by friction and mechanical play.

Many conventional apparatuses for precise angular or rotational positioning also include many mechanical parts that are difficult to manufacture and expensive to maintain.

There is an apparent need for a relatively simple and inexpensive apparatus that can be used to precisely measure an angular position or a rotational position of an object, particularly where the apparatus has relatively few moving parts and minimizes or eliminates inaccuracies associated with friction and/or mechanical play.

SUMMARY OF THE INVENTION

It is one object of this invention to provide an apparatus for precisely positioning an angular or a rotational position of an object.

It is another object of this invention to provide an apparatus with relatively few moving parts.

It is another object of this invention to provide an apparatus having a practical size and weight.

The above and other objects of this invention are accomplished with an apparatus and method for precise angular or rotational positioning of an object, which has a base, a first pivot arm and a second pivot arm operatively connected with respect to each other to convert a linear motion input to a rotational motion output, using a predetermined ratio of the linear motion of an input to an angular rotation of the output. The apparatus and method according to one embodiment of this invention significantly reduce hysteresis, is frictionless between an input force and an output force, and uses no gears or bearings.

In one embodiment of this invention, the pivot arms are connected with respect to the base by support structures that maintain each pivot arm within a defined plane during pivotal movement of the corresponding pivot arm. A structural member can rigidly connect the first pivot arm and the second pivot arm. With a rigid connection, when the first pivot arm moves the second pivot arm moves the same distance as the first pivot arm, at the area, line or point of interconnect.

More than two pivot arms can cooperate with each other to form a relatively large ratio of a first distance of the input movement to a second distance of the output movement. For example, the apparatus of this invention can be used to convert an input movement of 10 mm to an angular output movement of 378 microradians.

With the apparatus and method of this invention, conventional translational motion elements or tools, for example push rods, screws, motors, gears and the like, which typically have a range of motion of several millimeters can be used as an input source to position and precisely control the rotation or angular movement of an object which is placed at or near a pivot point of the second pivot arm, to achieve ultra small angular movements.

The apparatus and method of this invention can be used, for example, to precisely position X-ray optics, which typically require ultra-high precision positioning with angular position and accuracies of milliradians or microradians of crystal devices.

The pivot arms and other mechanical elements of this invention are preferably but not necessarily positioned within a base, such as a plate structure. Preferably but not necessarily, each pivot arm moves through a range of motion that is within a plane, such as a plane that passes through the base or the base plate. Many different structural arrangements of the apparatus of this invention can be used to accomplish movement of each pivot arm within a defined plane.

The apparatus of this invention is essentially frictionless, particularly between the input and the output movements, and has no hysteresis or mechanical play. The pivot arms are preferably rigid and either do not flex or bend or have negligible flexing and bending upon movement between an at rest position and a deflected position resulting from a force applied by the input motion. When the mechanical elements of this invention are moved within a full range between the at rest position and the deflected position, no element exceeds its modulus of elasticity, and thus eliminates or avoids structural fatigue. The modulus of elasticity of each pivot arm is a function of a length of the pivot arm. Thus, the length of the pivot arm can be selected to stay below the elastic limit of the pivot arm.

Two corresponding pivot arms of the apparatus are interconnected, using a rigid interconnect flex member. Thus, the second arm moves a same distance as the first arm, at the area, line or point of interconnect. Preferably but not necessarily, a force is applied so that the rigid interconnect flex member that connects two pivot arms is in tension.

If the apparatus of this invention has only one pivot arm, to achieve a motion:rotation ratio of 10 mm:378 microradians, for example, the one pivot arm would be impractically long. For example, the one pivot arm would have a length of approximately 0.2 mile and it would be necessary to move one end of the single pivot arm about 0.5 inch to achieve 37.8 microradians of rotation at the opposite pivoting end of the one pivot arm. If the apparatus of this invention has three pivot arms, the overall size of the apparatus that houses the three pivot arms can be reduced to approximately 12 inches by 12 inches, to accomplish a similar result.

The features of this invention are further defined in the following specification and in the claims.

BRIEF DESCRIPTION OF DRAWINGS

The above-described and other features of this invention can be better understood when taken in view of the drawings, wherein.

DETAILED DESCRIPTION OF PREFERRED EMBODIMENTS

Figure 1:
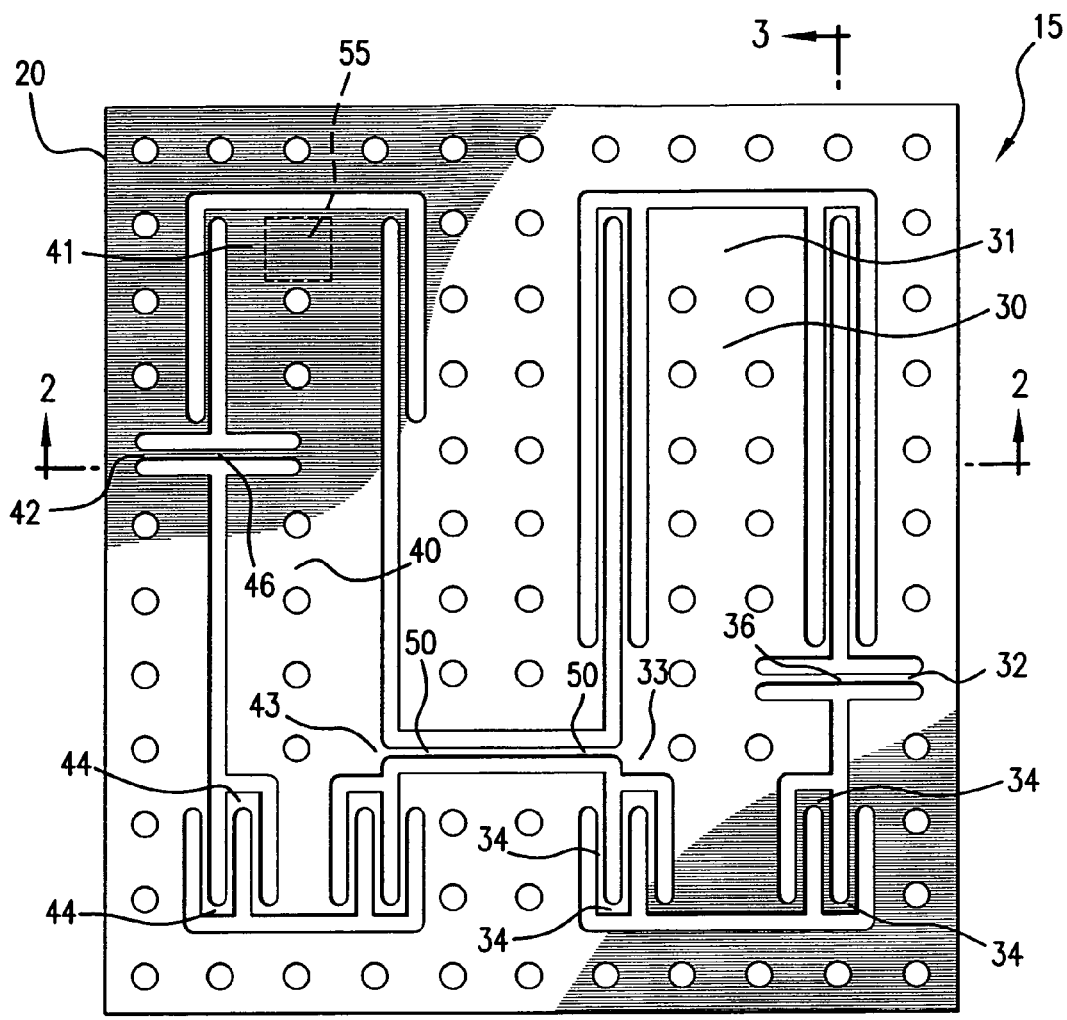
FIG. 1 is a plan view of an apparatus for precise angular positioning, according to one embodiment of this invention.
Figure 4:
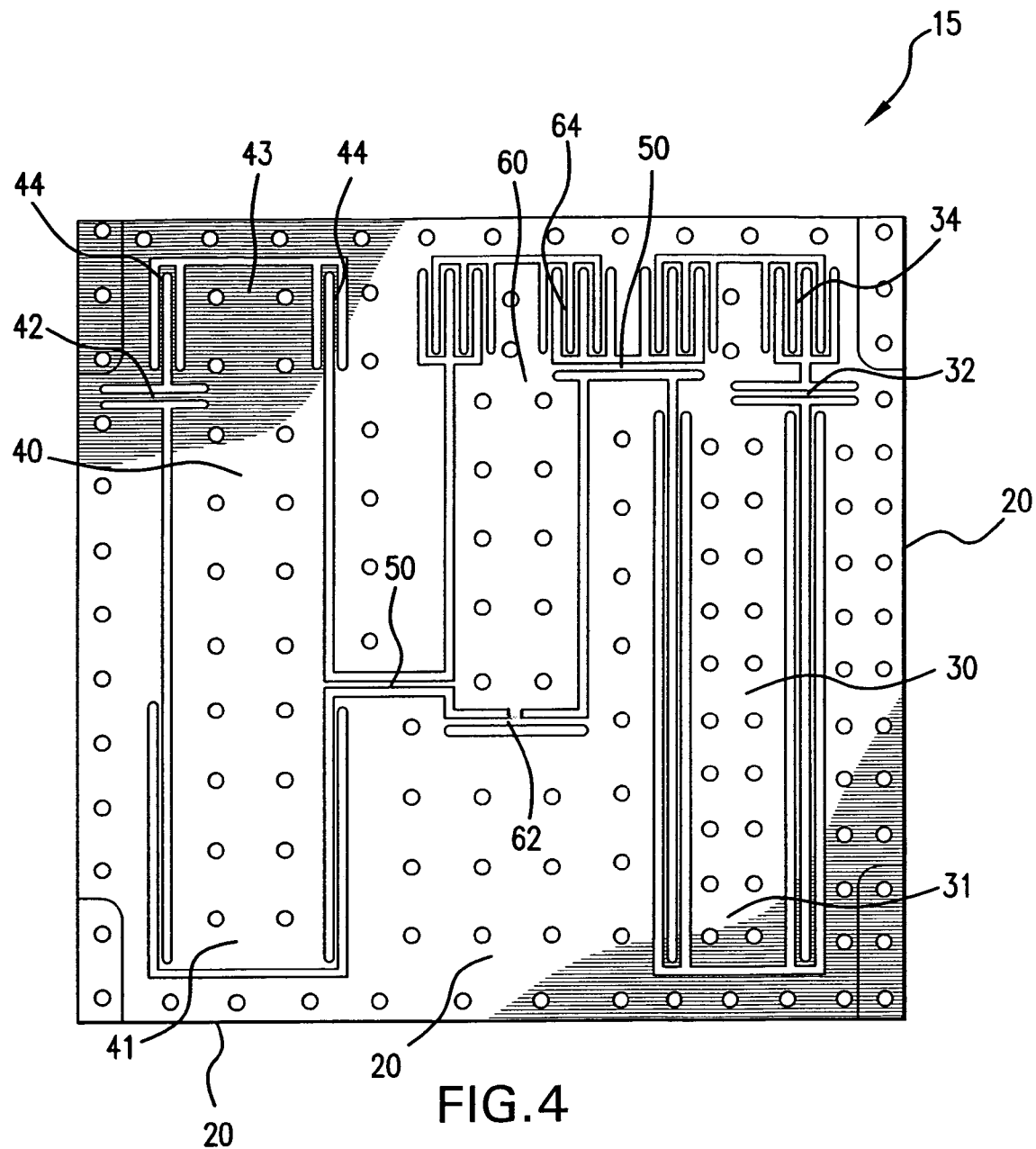
FIG. 4 is a top plan view of an apparatus for precise angular positioning, according to another embodiment of this invention.
Figure 5:
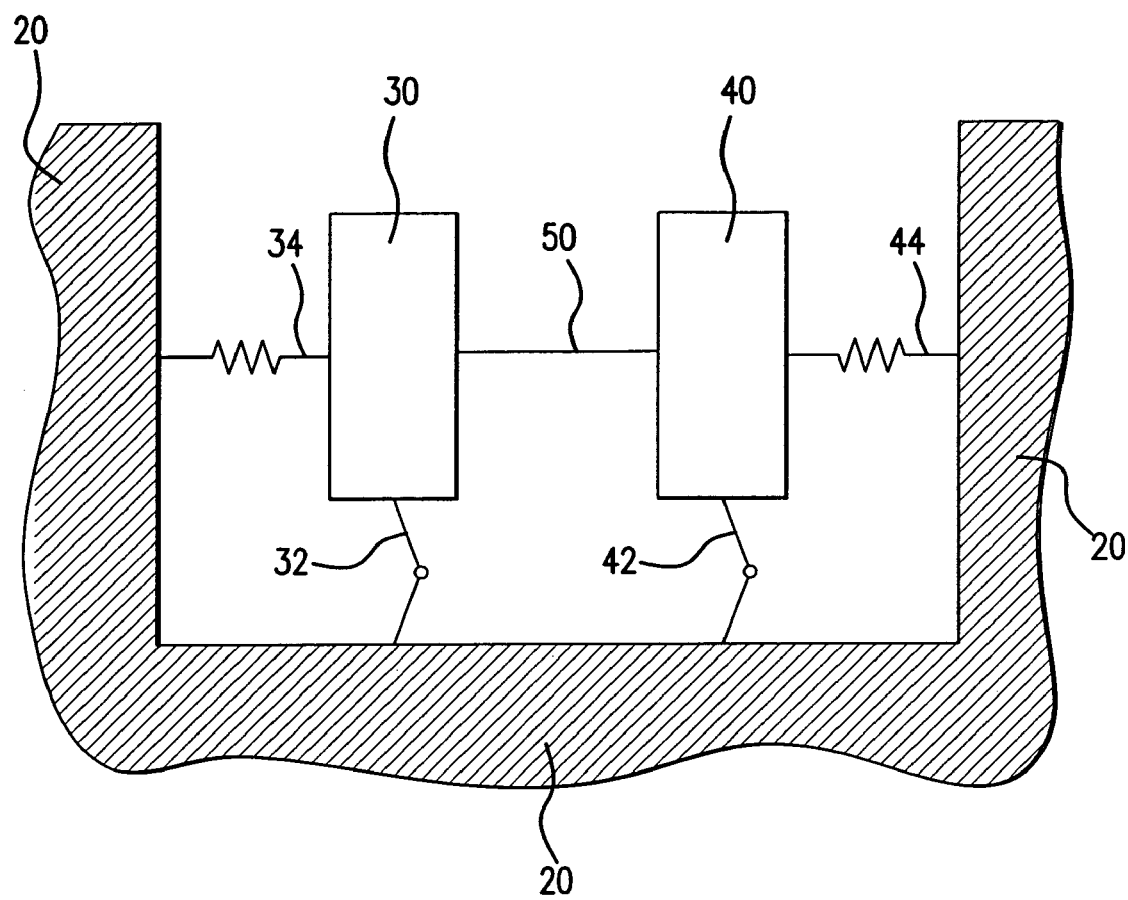
FIG. 5 is a schematic diagram showing two pivot arms and a base, wherein the base has a continuous bottom surface with no exposed channels, according to one embodiment of this invention.

FIG. 1 shows a plan view of apparatus 15, which can be used for precise angular positioning of an object. As shown in FIGS. 1, 4 and 5, apparatus 15 comprises base 20, pivot arm 30, pivot arm 40 and interconnect flex member 50 which is connected to and between pivot arm 30 and pivot arm 40.

Apparatus 15 of this invention can be used, for example, to translate a linear movement applied to end portion 31 of pivot arm 30 to a radial movement at pivot axis 46 of pivot base flex member 42. For example, end portion 31 can be moved a manageable distance, such as about 10 mm, which will result in pivot axis 46 moving an extremely small angle, such as about 378 microradians.

Apparatus 15 as shown in FIGS. 1 and 5 has two pivot arms 30 and 40. As shown in FIG. 4, apparatus 15 has three pivot arms 30, 40 and 60. Two or more pivot arms can be used to accomplish different ratios of input movement to output movement. More pivot arms can be used to decrease the overall size of apparatus 15. More pivot arms can be used to accomplish a higher ratio between an input movement and an output movement.

Figure 3:
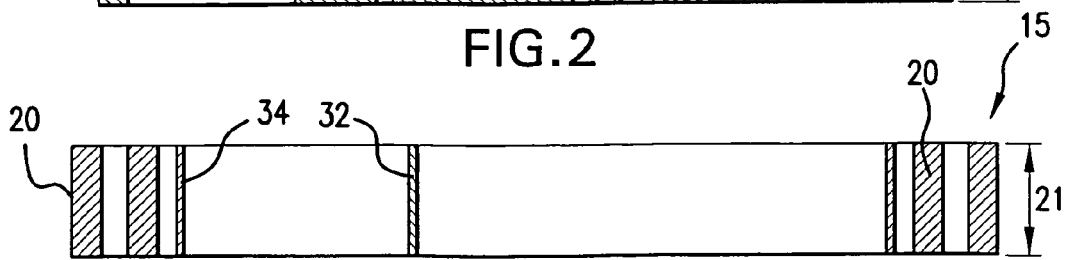
FIG. 3 is a sectional view, taken along line 3—3, as shown in FIG. 1, of the apparatus for precise angular positioning.

As shown in FIG. 1, pivot base flex member 32 is operatively connected to pivot arm 30 and is used to pivotally mount pivot arm 30 with respect to base 20. FIG. 3 shows a cross section of pivot base flex member 32, according to one embodiment of this invention. As shown in FIGS. 1 and 3, pivot base flex member 32 is a plate structure, but pivot base flex member 32 can also have any other suitable shaped structure. Pivot base flex member 32 is preferably an elastic member that moves between an at rest position and a deflected position, which corresponds to a range of movement of end portion 31 of pivot arm 30.

As shown in FIG. 1, with a similar structural arrangement, pivot base flex member 42 is operatively connected to pivot arm 40 and thus is used to pivotally mount pivot arm 40 with respect to base 20.

As shown in FIG. 1, support structure 34 maintains pivot arm 30 within a first plane when pivot arm 30 is moved along a pivotal path with respect to base 20. Likewise, support structure 44 is used to maintain pivot arm 40 within a second plane during a pivotal movement of pivot arm 40.

Figure 2:
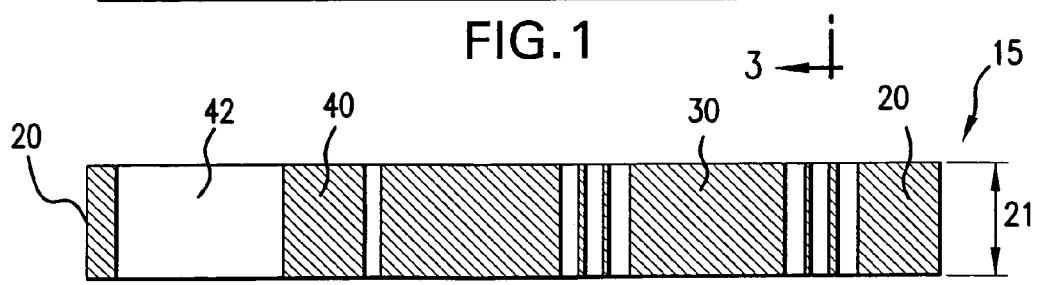
FIG. 2 is a sectional view, taken along line 2—2, as shown in FIG. 1, of the apparatus for precise angular positioning.

As shown in FIGS. 1–3, base 20 is formed as a plate structure. However, base 20 can have any other suitable shape that accommodates pivot arm 30, pivot arm 40 and/or interconnect flex member 50. Thickness 21, as shown in FIGS. 2 and 3, of base 20, corresponds to the thickness of pivot base flex members 32 and 42, which helps maintain pivot arms 30 and 40, respectively, within a plane throughout pivotal movement of pivot arms 30 and 40. Likewise, support structures 34 and 44 can be formed as a flexible plate structure, as shown in FIGS. 1–3, or can have any other suitably shaped structure.

The first plane and the second plane can be either different planes or the same plane. FIGS. 2 and 3 show line 24 passing through a central section of base 20. As shown in FIGS. 1–3, each of pivot arms 30 and 40 pivot within a plane defined by both lines 24, shown in FIGS. 2 and 3, when end portion 31 of pivot arm 30 is moved between the at rest position and the deflected position.

Any suitable displacement device can be used to move end portion 31 a predetermined or defined distance. As shown in FIG. 1, when pivot arm 30 moves within the first plane, pivot arm 30 pivots about a point along pivot base flex member 32, with respect to base 20. Likewise, when pivot arm 40 moves within the second plane, pivot arm 40 pivots about a point along pivot based flex member 42, with respect to base 20.

As shown in FIG. 1, interconnect flex member 50 is a structure that is formed as a plate. However, interconnect flex member 50 can have any other suitable shape, preferably one that provides a rigid structure. As shown in FIG. 1, interconnect flex member 50 is rigidly connected between pivot arms 30 and 40. Thus, when end portion 33 of pivot arm 30 moves a specific distance, end portion 43 of pivot arm 40 also moves the same specific distance. When end portion 43 moves, pivot arm 40 pivots about a point along pivot base flex member 42 and thus in response to movement of end portion 43, end portion 41 also moves.

In one embodiment according to this invention, base 20, pivot arms 30 and 40, pivot base flex members 32 and 42 and support structures 34 and 44 are all formed as an integrated piece. Although the integrated structure practically eliminates movement losses between an input movement at end portion 31 and an output movement at end portion 41, any one or more of the structural elements can be formed as a separate piece and secured with respect to one or more of the corresponding elements of apparatus 15, as previously discussed.

FIG. 1 shows two different areas of support structure 34 and two different areas of support structure 44. Each support structure as shown in FIG. 1 has, follows or forms an overall serpentine shape. The overall serpentine shape also helps maintain the elements of apparatus 15 within the defined plane during movement between the at rest position and a deflected position of pivot arm 30 and the other corresponding elements that move in response to movement of pivot arm 30.

Between the at rest position and the deflected position, pivot arm 30, pivot base flex member 32, support structure 34, pivot arm 40, pivot base flex member 42, support structure 44 and/or interconnect flex member 50 do not exceed a modulus of elasticity for each of the corresponding elements. The particular shape, size and type of material can be selected so that the modulus of elasticity is not exceeded.

Object 55, such as a crystal lens, for example as used in Laue crystal device or a Bragg crystal device, can be attached with respect to end portion 41 of pivot arm 40, such as in the relative position shown in FIG. 1, or in any other suitable relative position on or with respect to pivot arm 40. Object 55, which is attached to or with respect to pivot arm 40 in any suitable mechanical manner, moves in response to a movement of end portion 31 of pivot arm 30. When positioned as shown in FIG. 1, when pivot arm 40 moves then object 55 has responsive translational and rotational or pivotal movement. In another embodiment of this invention, object 55 can be positioned at pivot axis 46 so that in response to movement of pivot arm 40, object 55 has only rotational or pivotal movement.

In one embodiment according to this invention, a method for achieving a precise angular position of object 55 is achieved by first moving pivot arm 30 with respect to base 20. Because pivot arm 30 is operatively connected to pivot base flex member 32 and interconnect flex member 50, and also because pivot arm 40 is operatively connected to pivot base flex member 42 and interconnect flex member 50, movement of end portion 31 and thus pivot arm 30 translates into movement of end portion 41 of pivot arm 40. Preferably but not necessarily, pivot arm 30 and/or pivot arm 40 are maintained within different general planes or the same general plane, depending upon the structural attachment and different thicknesses and/or elevations between elements of apparatus 15 according to this invention.

FIG. 4 shows apparatus 15 according to another embodiment of this invention. As shown in FIG. 4, pivot arm 60 is a third pivot arm attached between pivot arm 30 and pivot arm 40, similar to those described with respect to FIGS. 1–3. Pivot base flex member 62 pivotally connects pivot arm 60 with respect to base 20. The remaining components that cooperate with pivot arm 60 and/or pivot base flex member 62 are similar to those discussed in view of FIGS. 1–3. The third pivot arm 60 can provide an increased ratio of input movement to output movement.

Apparatus 15 according to this invention, particularly as shown in FIGS. 1–4, operates in a frictionless manner with no hysteresis or no mechanical play among the different elements. The dimensions of each element and relative distances between elements can be varied to achieve different ratios of the input movement to the output movement.

For example, as shown in FIG. 1, if pivot arm 30, pivot base flex member 32 and support structure 34 are sized and shaped so that when pivot arm 30 pivots about a point along pivot base flex member 32, a point at interconnect flex member 50 moves 1 mm when a point on end portion 31 moves 10 mm, and the ratio is 1:10. In such particular example, when end portion 31 is moved 10 mm, pivot arm 30 moves so that a point on interconnect flex member 50 moves 1 mm. When interconnect flex member 50 moves 1 mm, a point of end portion 43 at interconnect flex member 50 also moves 1 mm. If pivot arm 40 is designed so that the ratio is 1:6, then the effective compound ratio between the point on end portion 31 and the rotation about pivot axis 46 of pivot base flex member 42 is 1:60. By using a third pivot arm, such as shown in FIG. 4, it is possible to achieve a movement at a point on end portion 41 of only about 378 microradians, in response to a movement of 10 mm at a point on end portion 31, and the overall apparatus 15 is approximately 12 inches by 12 inches.

Different ratios and different distances between elements or particular points on apparatus 15 can be used to vary the different ratios between a distance that a pivot arm is moved and a resulting rotation that occurs at the pivot axis of a pivot base flex member. For example, as shown in FIG. 4, with apparatus having three pivot arms 30, 40 and 60, if a first distance from pivot axis 46 located along pivot base flex member 42 to a first point along interconnect flex member 50 is selected to be 110 mm, a second distance from the first point to a second point along pivot base flex member 62 is selected to provide a movement:movement ratio of 1:12, and a third distance from the second point to pivot axis 36 located along pivot base flex member 32 is selected to provide a movement:movement ration of 1:20, then 1 mm of movement at pivot arm 30, such as at or near end portion 31 can result in a rotational movement of: 1 mm/(110 mm*12*20)=1/26,400=37.8 microradians. Other distances and ratios can be selected to achieve different movement: rotation ratios that can be achieved with apparatus 15 according to this invention.

Any suitable screw device, gear mechanism, cam device and/or other mechanical device can be connected with respect to end portion 31 of pivot arm 30, to provide the input movement.

The different elements of this invention can be constructed of a lightweight metal, such as an aluminum, an aluminum alloy or any other suitable rigid metal or nonmetal material. As shown in FIGS. 1 and 4, base 20 has a plurality of mounting holes, shown as full circles, spaced apart from each other. The mounting holes can be used to mount or otherwise attach or connect base 20 to another element, such as a structural support member, and/or can be used to mount or otherwise attach or connect to base 20 another element, such as a crystal lens or a holder for a crystal lens. More or less mounting holes can be used and can be spaced apart from each other differently than as shown in FIGS. 1 and 4. Also, in other embodiments, base 20 can have no mounting holes. Other structural members and/or mechanical connectors can be used in lieu of or in combination with the mounting hole or holes.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An apparatus for precise angular positioning, the apparatus comprising:
    a base, a first pivot arm, a second pivot arm;
    a first pivot base flex member operatively connected to said first pivot arm and pivotally mounting said first pivot arm with respect to said base, said first pivot arm pivoting about a first pivot axis of said first pivot base flex member;
    a first support structure maintaining said first pivot arm within a first plane during a pivotal movement of said pivot arm;
    a second pivot base flex member operatively connected to said second pivot arm and pivotally mounting said second pivot arm with respect to said base, said second pivot arm pivoting about a second pivot axis of said second pivot base flex member;
    a second support structure maintaining said second pivot arm within a second plane; and
    an interconnect flex member connected to and between said first pivot arm and said second pivot arm.

2. The apparatus according to claim 1, wherein said base is formed as a plate.

3. The apparatus according to claim 1, wherein at least one of said first support structure and said second support structure is formed as a flexible plate.

4. The apparatus according to claim 1, wherein said first plane passes through said base.

5. The apparatus according to claim 1, wherein said first support structure is connected to said first pivot arm and to said base.

6. The apparatus according to claim 1, wherein said second support structure is connected to said second pivot arm and said base.

7. The apparatus according to claim 1, wherein said interconnect flex member is formed as a plate.

8. The apparatus according to claim 1, wherein said first pivot arm, said first pivot base flex member, said first support structure, said second pivot arm, said second pivot base flex member and said second support structure are integrated with said base.

9. The apparatus according to claim 1, wherein said first pivot arm is movable with respect to said base.

10. The apparatus according to claim 1, wherein said first pivot arm and said second pivot arm each is a rigid structure.

11. The apparatus according to claim 1, wherein said first support structure and said second support structure each forms a serpentine shaped structure.

12. The apparatus according to claim 11, wherein said serpentine shaped structure provides structural rigidity to and maintains said first pivot arm within said first plane and said second pivot arm within said second plane.

13. The apparatus according to claim 1, wherein when said first pivot arm is moved between an at rest position and a deflected position, movements of said first pivot arm, said first pivot base flex member, said second pivot arm and said second pivot base flex member prevent said first pivot arm, said first pivot base flex member, said second pivot arm and said second pivot base flex member from exceeding a corresponding modulus of elasticity range.

14. The apparatus according to claim 1, wherein an end portion of said second arm has an output movement.

15. A method for achieving a precise angular positioning, comprising:
  moving a first pivot arm about a first pivot axis with respect to a base;
  operatively connecting a first pivot base flex member to said first pivot arm;
  maintaining said first pivot arm within a first plane during a pivotal movement of said pivot arm;
  operatively connecting a second pivot base flex member to said second pivot arm;
  pivotally moving said second pivot arm about a second pivot axis with respect to said base; and
  maintaining said second pivot arm within a second plane.

16. The method according to claim 15, wherein said base is formed as a plate.

17. The method according to claim 15, wherein at least one of said first support structure and said second support structure moves as a flexible plate.

18. The method according to claim 15, wherein said first plane passes through said base.

19. The method according to claim 15, wherein said first support structure is connected to said first pivot arm and to said base.

20. The method according to claim 15, wherein said second support structure is connected to said second pivot arm and said base.

21. The method according to claim 15, wherein said first pivot arm, said first pivot base flex member, said first support structure, said second pivot arm, said second pivot base flex member and said second support structure are integrated with said base.

22. The method according to claim 15, wherein said first pivot arm is movable with respect to said base.

23. The method according to claim 15, wherein said first pivot arm and said second pivot arm each moves as a rigid structure.

24. The method according to claim 15, wherein said first support structure and said second support structure each forms a serpentine shaped structure.

25. The method according to claim 15, wherein a serpentine shaped structure provides structural rigidity to and maintains said first pivot arm within said first plane and said second pivot arm within said second plane.

26. The method according to claim 15, wherein when said first pivot arm is moved between an at rest position and a deflected position, movements of said first pivot arm, said first pivot base flex member, said second pivot arm and said second pivot base flex member prevent said first pivot arm, said first pivot base flex member, said second pivot arm and said second pivot base flex member from exceeding a corresponding modulus of elasticity range.

27. The method according to claim 15, wherein an end portion of said second arm has an output movement.

* * * * *